a2f31489B2

(12) United States Patent
Lai et al.

(10) Patent No.: US 12,131,489 B2
(45) Date of Patent: Oct. 29, 2024

(54) SEMI-AUTOMATIC DATA COLLECTION AND ASSOCIATION FOR MULTI-CAMERA TRACKING

(71) Applicant: NEC Laboratories America, Inc., Princeton, NJ (US)

(72) Inventors: Farley Lai, Santa Clara, CA (US); Asim Kadav, Mountain View, CA (US); Likitha Lakshminarayanan, Los Angeles, CA (US)

(73) Assignee: NEC Corporation, Tokyo (JP)

( * ) Notice: Subject to any disclaimer, the term of this patent is extended or adjusted under 35 U.S.C. 154(b) by 360 days.

(21) Appl. No.: 17/741,735

(22) Filed: May 11, 2022

(65) Prior Publication Data

US 2022/0383522 A1    Dec. 1, 2022

Related U.S. Application Data

(60) Provisional application No. 63/193,151, filed on May 26, 2021.

(51) Int. Cl.
*G06T 7/292* (2017.01)
*G06T 7/223* (2017.01)
(Continued)

(52) U.S. Cl.
CPC .............. *G06T 7/292* (2017.01); *G06T 7/223* (2017.01); *G06T 7/248* (2017.01); *G06V 20/52* (2022.01);
(Continued)

(58) Field of Classification Search
CPC ......... G06T 7/223; G06T 7/248; G06T 7/292; G06T 2200/24; G06T 2207/10016;
(Continued)

(56) References Cited

U.S. PATENT DOCUMENTS 10,789,720 B1 *   9/2020   Mirza ................... G06T 7/246
2006/0279630 A1 * 12/2006   Aggarwal ........ G08B 13/19645
                                                      348/42

(Continued)

OTHER PUBLICATIONS

Hahn et al. "Tripping through time: Efficient Localization of Activities in Videos." 31st British Machine Vision Conference, BMVC 2020. 2020. (Year: 2020).*

(Continued)

*Primary Examiner* — Katrina R Fujita
(74) *Attorney, Agent, or Firm* — Joseph Kolodka

(57) ABSTRACT

A surveillance system is provided. The surveillance system is configured for (i) detecting and tracking persons locally for each camera input video stream using the common area anchor boxes and assigning each detected ones of the persons a local track id, (ii) associating a same person in overlapping camera views to a global track id, and collecting associated track boxes as the same person moves in different camera views over time using a priority queue and the local track id and the global track id, (iii) performing track data collection to derive a spatial transformation through matched track box spatial features of a same person over time for scene coverage and (iv) learning a multi-camera tracker given visual features from matched track boxes of distinct people across cameras based on the derived spatial transformation.

20 Claims, 5 Drawing Sheets

(51) Int. Cl.
   *G06T 7/246* (2017.01)
   *G06V 20/52* (2022.01)
(52) U.S. Cl.
   CPC .............................. *G06T 2200/24* (2013.01);
      *G06T 2207/10016* (2013.01); *G06T 2207/20081* (2013.01); *G06T 2207/30196* (2013.01); *G06T 2207/30232* (2013.01)
(58) Field of Classification Search
   CPC . G06T 2207/20081; G06T 2207/30196; G06T 2207/30232; G06V 20/52
   See application file for complete search history.

(56) References Cited

U.S. PATENT DOCUMENTS

| | | | |
|---|---|---|---|
| 2009/0219391 A1* | 9/2009 | McLeish | G06T 7/277 348/169 |
| 2010/0208941 A1* | 8/2010 | Broaddus | G08B 13/19608 382/103 |
| 2017/0372153 A1* | 12/2017 | Justice | G06F 18/217 |
| 2018/0286199 A1* | 10/2018 | Chen | G06V 10/46 |
| 2019/0220982 A1* | 7/2019 | Gottumukkal | G08B 13/19608 |
| 2019/0370551 A1* | 12/2019 | Mao | G06V 20/52 |
| 2020/0175694 A1* | 6/2020 | Kato | G06T 7/90 |
| 2021/0190936 A1* | 6/2021 | Sabripour | G06F 18/2431 |
| 2021/0287503 A1* | 9/2021 | Tarui | G08B 13/19608 |
| 2022/0051017 A1* | 2/2022 | Choi | G06V 10/764 |
| 2022/0185625 A1* | 6/2022 | One | B66B 1/34 |
| 2022/0261593 A1* | 8/2022 | Yu | G06N 3/088 |

OTHER PUBLICATIONS

Khan et al. "Multi-Person Tracking Based on Faster R-CNN and Deep Appearance Features." Visual Object Tracking with Deep Neural Networks. IntechOpen, 2019. (Year: 2019).*

Ristani et al. "Features for Multi-Target Multi-Camera Tracking and Re-Identification." arXiv preprint arXiv:1803. 10859 (2018). (Year: 2018).*

Sun, ShiJie, et al. "Simultaneous detection and tracking with motion modelling for multiple object tracking." Computer Vision-ECCV 2020: 16th European Conference, Glasgow, UK, Aug. 23-28, 2020, Proceedings, Part XXIV 16. Springer International Publishing, 2020. (Year: 2020).*

Wu, C. E., Lai, F., Hu, Y. H., & Kadav, A. (Jan. 4, 2022). Self-supervised Video Representation Learning with Cascade Positive Retrieval. In Proceedings of the IEEE/CVF Conference on Computer Vision and Pattern Recognition (pp. 4070-4079).

* cited by examiner

SEMI-AUTOMATIC DATA COLLECTION AND ASSOCIATION FOR MULTI-CAMERA TRACKING

RELATED APPLICATION INFORMATION

This application claims priority to U.S. Provisional Patent Application No. 63/193,151, filed on May 26, 2021, incorporated herein by reference in its entirety.

BACKGROUND

Technical Field

The present invention relates to imaging and more particularly to semi-automatic data collection and association for multi-camera tracking.

Description of the Related Art

Practical video surveillance tends to require per person tracking across multiple cameras to capture individual actions through time. Compared with other popular image classification and object detection tasks, it is rare to find a large public dataset for multi-camera multi-object tracking due to increasing privacy concern and limited annotation budget, making it infeasible to train a highly accurate machine learning model to capture the same person's action across cameras. Even if there is such a dataset, it is often necessary to fine-tune the model in a new environment by collecting and annotating new data. However, it remains time-consuming and costly to generalize across multiple physical sites such as retail stores even through crowdsourcing.

SUMMARY

According to aspects of the present invention, a surveillance system is provided. The surveillance system includes a plurality of cameras arranged at a deployment site with partial view overlap. The surveillance system further includes a graphical user interface for placing a plurality of common area anchor boxes having matching ones located in different camera views. Each of the plurality of common area anchor boxes is designed to accommodate only one person at a time. The surveillance system further includes a processor device operatively coupled to the graphical user interface and the plurality of cameras for (i) detecting and tracking persons locally for each camera input video stream using the common area anchor boxes and assigning each detected ones of the persons a local track id, (ii) associating a same person in overlapping camera views to a global track id, and collecting associated track boxes as the same person moves in different camera views over time using a priority queue and the local track id and the global track id, (iii) performing track data collection to derive a spatial transformation through matched track box spatial features of a same person over time for scene coverage and (iv) learning a multi-camera tracker given visual features from matched track boxes of distinct people across cameras based on the derived spatial transformation.

According to other aspects of the present invention, a computer-implemented method for surveillance is provided. The method includes monitoring a plurality of cameras at a deployment site arranged with partial view overlap. The method further includes placing, using a graphical user interface, a plurality of common area anchor boxes having matching ones located in different camera views. Each of the plurality of common area anchor boxes is designed to accommodate only one person at a time. The method also includes detecting and tracking persons locally for each camera input video stream using the common area anchor boxes and assigning each detected ones of the persons a local track id. The method additionally includes associating a same person in overlapping camera views to a global track id, and collecting associated track boxes as the same person moves in different camera views over time using a priority queue and the local track id and the global track id. The method further includes performing, by a processor device, performing track data collection to derive a spatial transformation through matched track box spatial features of a same person over time for scene coverage and learning a multi-camera tracker given visual features from matched track boxes of distinct people across cameras based on the derived spatial transformation.

According to yet other aspects of the present invention, a computer program product for surveillance is provided. The computer program product includes a non-transitory computer readable storage medium having program instructions embodied therewith. The program instructions are executable by a computer to cause the computer to perform a method. The method includes monitoring, by a processor device of the computer, a plurality of cameras at a deployment site arranged with partial view overlap. The method further includes placing, using a graphical user interface of the computer, a plurality of common area anchor boxes having matching ones located in different camera views. Each of the plurality of common area anchor boxes is designed to accommodate only one person at a time. The method also includes detecting and tracking, by the processor device, persons locally for each camera input video stream using the common area anchor boxes and assigning each detected ones of the persons a local track id. The method additionally includes associating, by the processor device, a same person in overlapping camera views to a global track id, and collecting associated track boxes as the same person moves in different camera views over time using a priority queue and the local track id and the global track id. The method further includes performing, by the processor device, performing track data collection to derive a spatial transformation through matched track box spatial features of a same person over time for scene coverage and learning a multi-camera tracker given visual features from matched track boxes of distinct people across cameras based on the derived spatial transformation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to semi-automatic data collection and association for multi-camera tracking.

Embodiments of the present invention provide a semi-automatic approach to facilitating the annotation of track correspondences across multiple surveillance cameras onsite.

Embodiments of the present invention provide a setup and algorithm to associate person tracks from multiple camera views over time. The setup at real-time associates detected person bounding boxes in different cameras with respect to time proximity and intersection over common areas.

Embodiments of the present invention enable comprehensive data collection of corresponding tracks through multi-view transformation. Given the corresponding person tracks over time, the spatial mapping across cameras can be derived from a multi-view transformation, allowing to capture object correspondences everywhere in the camera field of view.

In summary, in combining the preceding features, the proposed semi-automatic approach facilitates training a multi-camera tracker with a rich and diverse dataset that can be efficiently and economically collected from many deployment sites.

A deployed video surveillance system typically provides real-time video streams producing time synchronized frames from multiple cameras sharing partially overlapping areas. Embodiments of the present invention exploit the observation and set up several common area anchors in different camera views to associate the same person on entering, resulting in track correspondences to be captured over time at a low cost, providing abundant data to train and fine-tune related computer vision tasks such as reidentification and action recognition to improve overall surveillance performance. In comparison, previous work tends to rely on face detection techniques which do not perform well in video surveillance due to unusual camera angles and a longer distance from target faces. This proposed approach fills the gap with less limitation.

Moreover, embodiments of the present invention collect corresponding tracks across different cameras despite occlusions.

Figure 1:
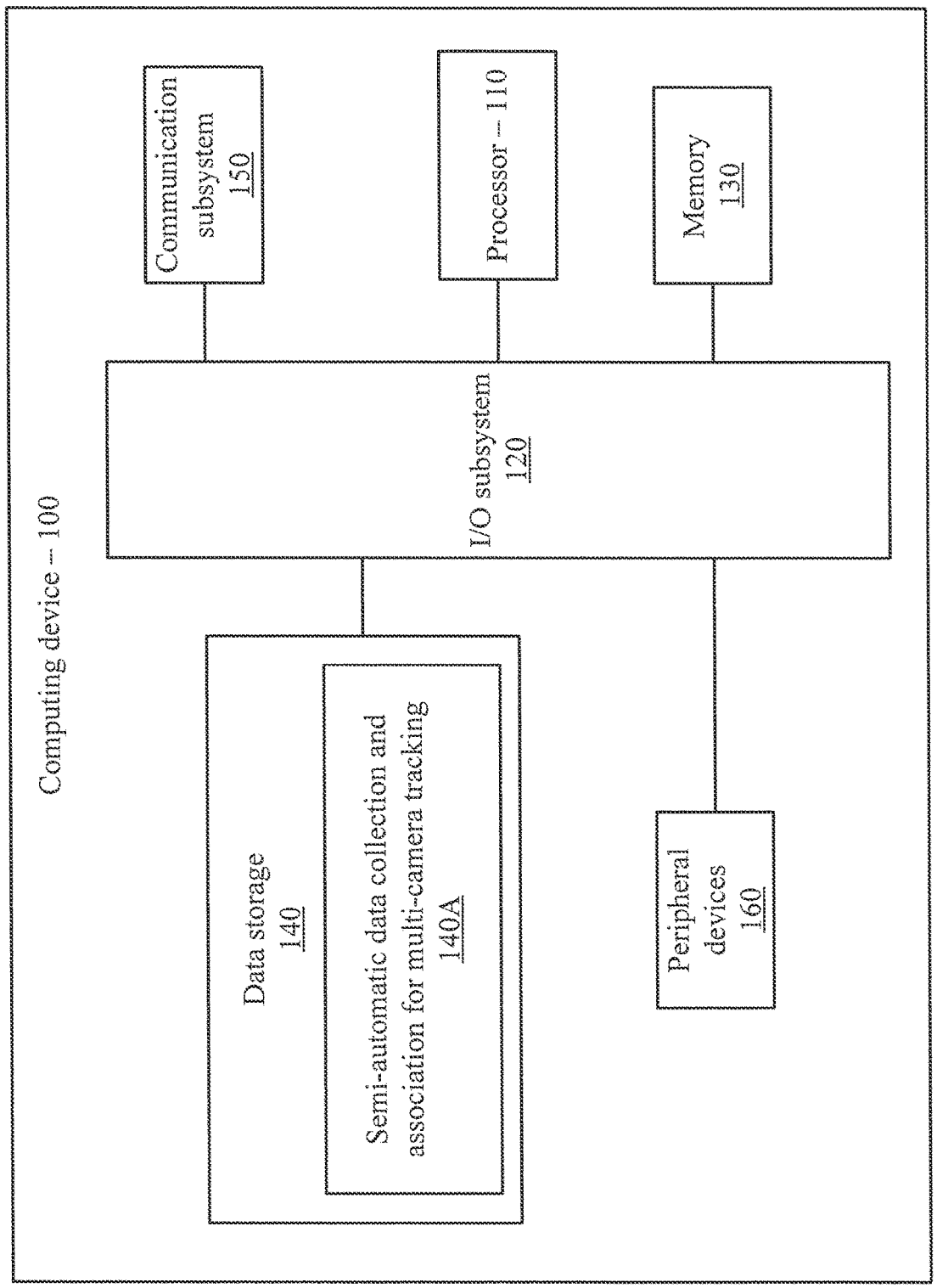
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform semi-automatic data collection and association for multi-camera tracking.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally, or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for semi-automatic data collection and association for multi-camera tracking. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention The prerequisite of the invention is a surveillance system deployment with more than one camera set up.

Figure 2:
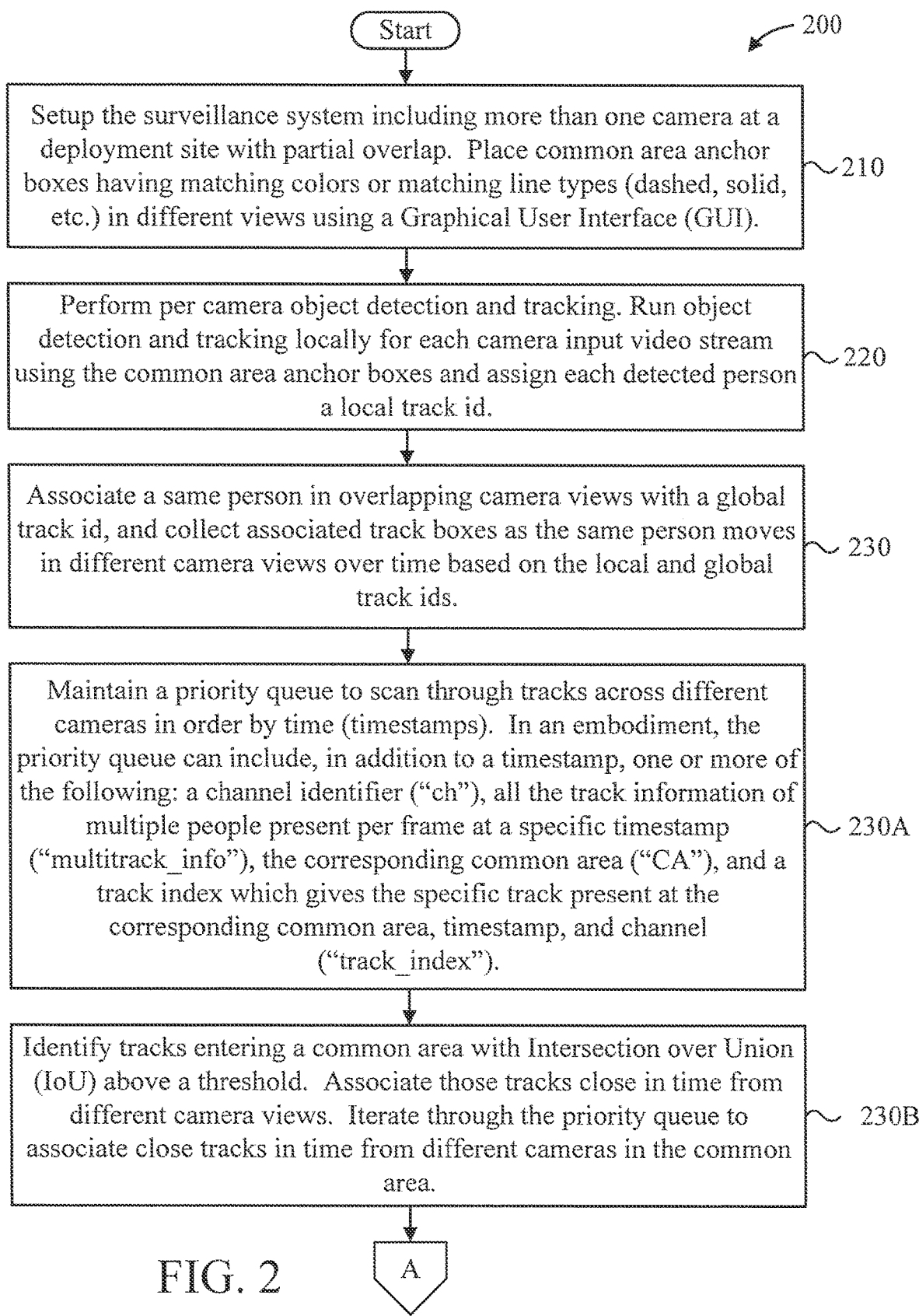
FIGS. 2-3 are flow diagrams showing an exemplary method for multi-camera tracking, in accordance with an embodiment of the present invention.
Figure 3:
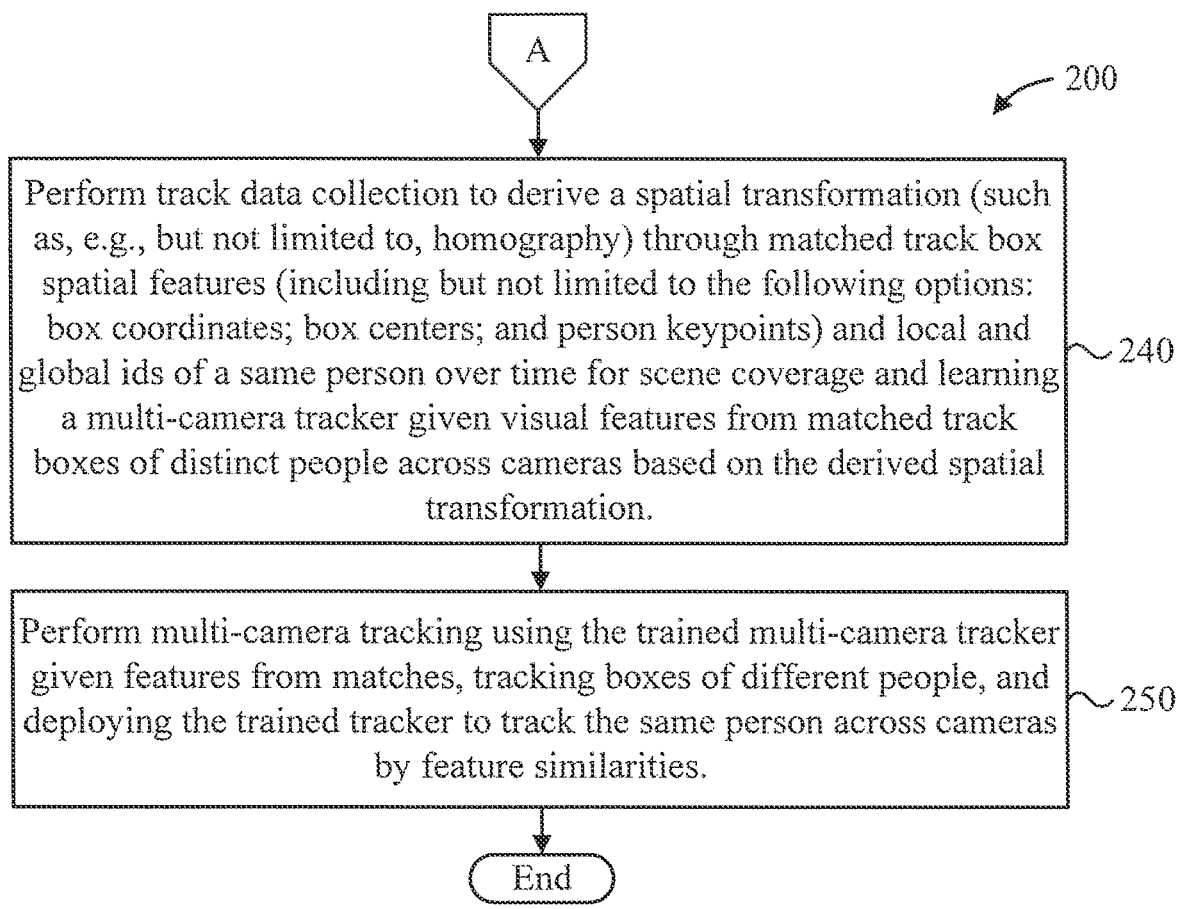

FIGS. 2-3 are flow diagrams showing an exemplary method 200 for multi-camera tracking, in accordance with an embodiment of the present invention.

At block 210, setup the surveillance system including more than one camera at a deployment site with partial overlap. Place common area anchor boxes having matching colors or matching line types (dashed, solid, etc.) in different views using a Graphical User Interface (GUI). Here, the common area anchor boxes are shown using different types of lines. A common area is a location designed to accommodate only one person at a time.

At block 220, perform per camera object detection and tracking. Run object detection and tracking locally for each camera input video stream using the common area anchor boxes and assign each detected person a local track id.

At block 230, associate a same person in overlapping camera views with a global track id, and collect associated track boxes as the same person moves in different camera views over time based on the local and global track ids. Specifically, for each common area marked by anchor boxes through the GUI, a queue-like data structure is used to capture tracked person detection boxes or simply track boxes passing through ordered by time from multiple cameras. Once two track boxes from different cameras are determined to be close enough in time, both can be associated by assigning a goal track id corresponding to their local ids. If there are more than two cameras to associate, the track box from a third camera can be associated with the global track id previously assigned to the other earlier track box through transitivity.

In an embodiment, block 230 can include one or more of blocks 230A-230B.

At block 230A, maintain, by each common area, a priority queue to scan through tracks across different cameras with sufficiently large IoU in order by time (timestamps). In an embodiment, the priority queue can accept track boxes, each with information including a timestamp and a camera channel identifier (interchangeably referred to as "ch") to sort and determine track indexes ordered by time and channel ids.

At block 230B, identify tracks entering a common area with Intersection over Union (IoU) above a threshold indicating a sufficiently large overlap with the marked common area anchor box. In an embodiment, associate those tracks close in time from different camera views. In an embodiment, the common area can be defined by contextual rules. In further detail, the contextual rules may explicitly specify a common area anchor box explicitly or from a detected object such as a doormat. Iterate through the priority queue to associate close tracks in time from different cameras in the common area.

At block 240, perform track data collection to derive a spatial transformation (such as, e.g., but not limited to, homography) through matched track box spatial features (including but not limited to the following options: box coordinates; box centers; and person key points) of a same person over time for scene coverage and learn a multi-camera tracker given visual features from matched track boxes of distinct people across cameras based on the derived spatial transformation. Those common area anchor boxes are no longer necessary as tracks from different cameras and can now be matched if a track box after the spatial transformation has a sufficiently large overlap with another track box from a different camera according to the metric such as IoU. In this way, collect matched corresponding track boxes over time for better coverage in the scenes. Each track box corresponds to a single person.

At block 250, perform multi-camera tracking using the trained multi-camera tracker given features from matches, tracking boxes of different people, and deploying the trained tracker to track the same person across cameras by feature similarities. The spatial transformation and common area anchor boxes are no longer needed.

A robot or vehicle can be controlled to move to avoid a collision based on the multi-camera tracking. The robot or vehicle can be controlled via an acceleration, turning, or braking system to avoid a collision with a person.

Figure 4:
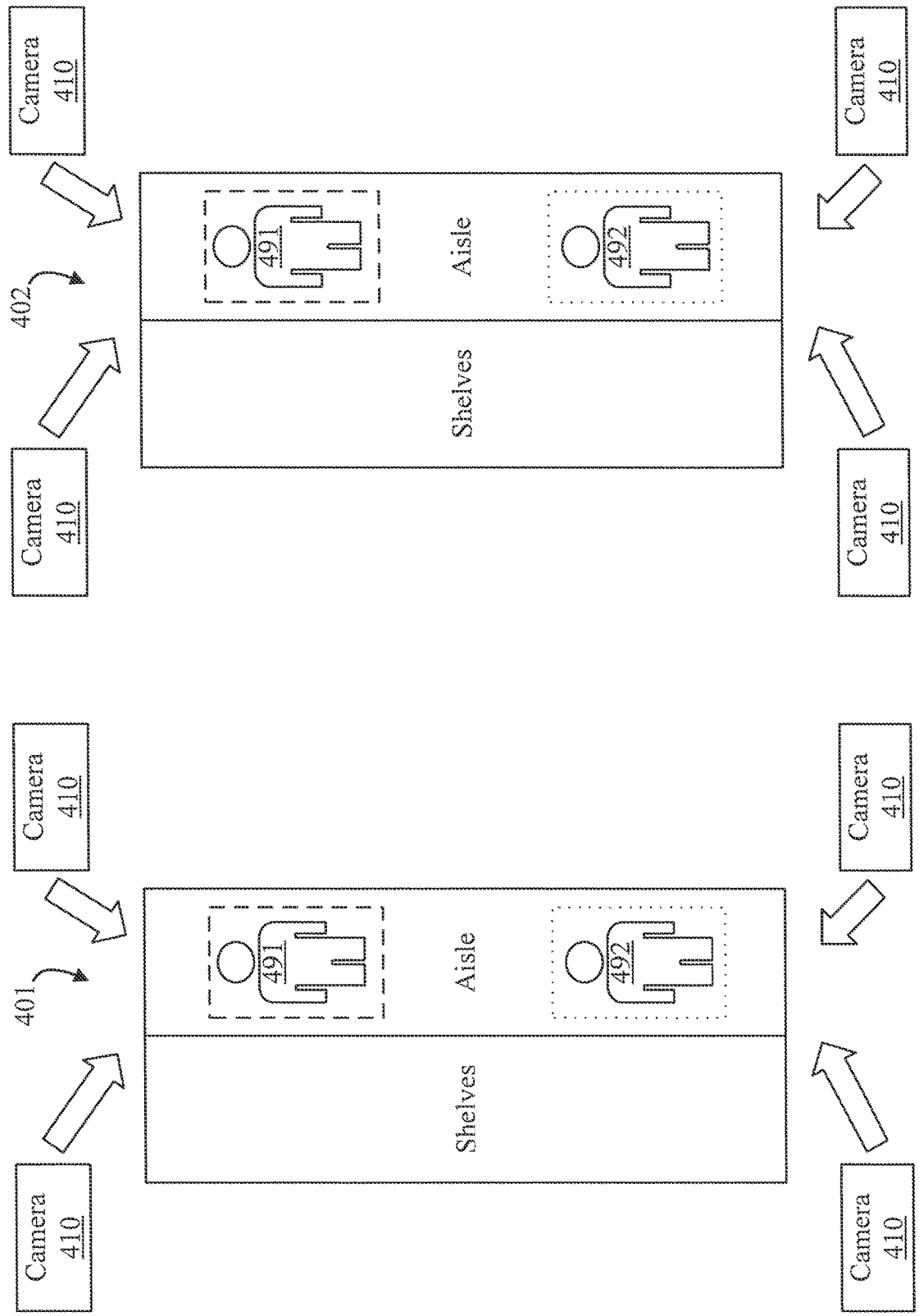
FIG. 4 is a block diagram graphically illustrating at least portions of block, in accordance with an embodiment of the present invention.

FIG. 4 is a block diagram graphically illustrating at least portions of block 210, in accordance with an embodiment of the present invention.

At a deployment site, multiple cameras 410 are configured to have overlapping views. A GUI is used to assign common area anchor boxes to areas in which only one person can occupy. In FIG. 3, two scenes 401 and 402 are shown. Dashed anchor boxes correspond to a first person 491 in the two scenes 401 and 402, and dotted anchor boxes correspond to a second person 492 in the two scenes 401 and 402. In this way, person detecting and tracking across multiple scenes can be performed as described in further detail herein. While a GUI can be used to assign boxes of the same line type to a same person, in other embodiments, different color boxes can be used. Of course, other ways still can be used to differentiate the boxes as readily appreciated by one of ordinary skill in the art.

Figure 5:
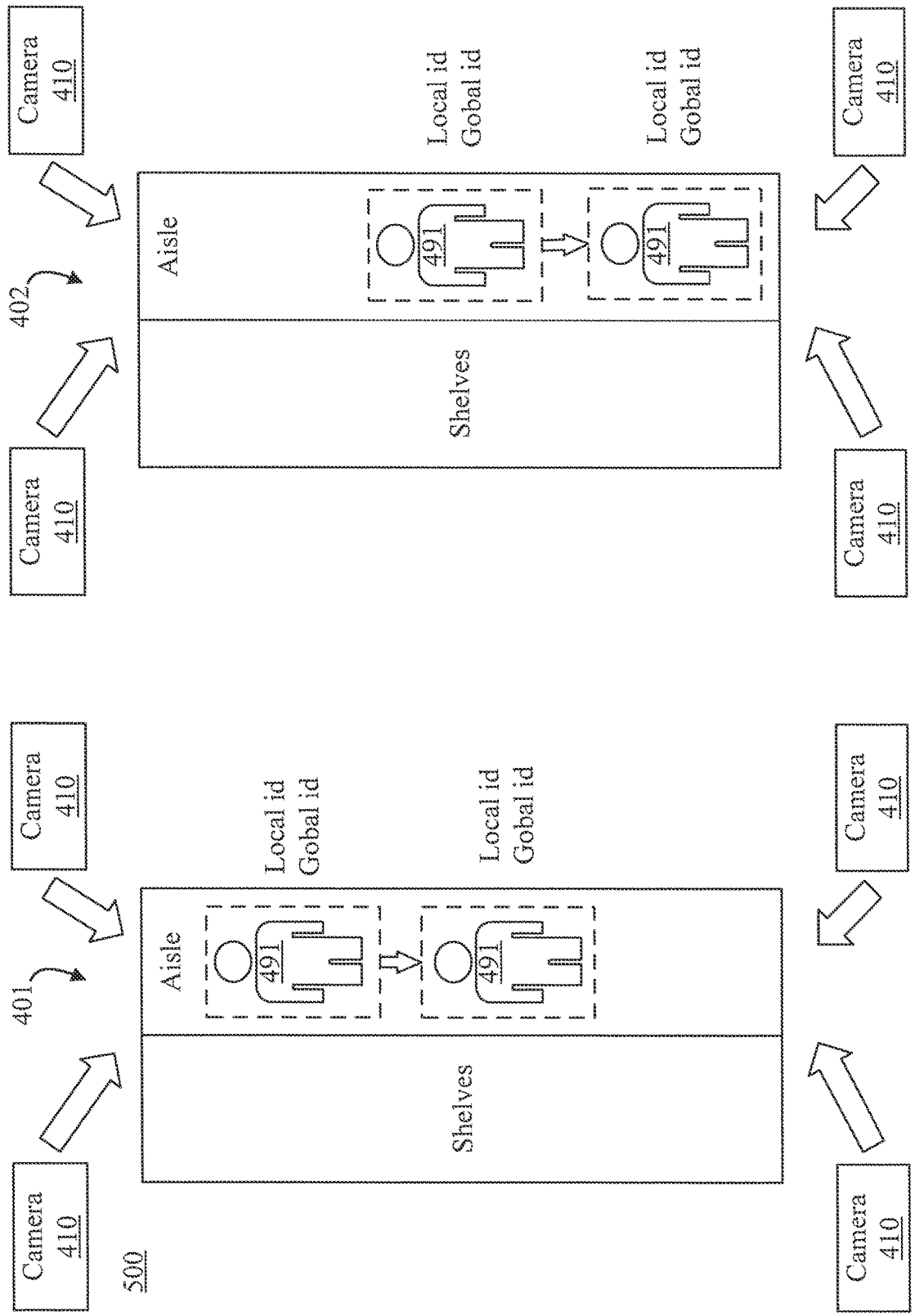
FIG. 5 is a block diagram graphically illustrating an environment in which the present invention can be implemented, in accordance with an embodiment of the present invention.

FIG. 5 is a block diagram graphically illustrating an environment 500 in which the present invention can be implemented, in accordance with an embodiment of the present invention.

In FIG. 5, local ids are used to track a user in a single scene as the user moves within the same single scene (e.g., scene 401 or 402), while global ids are used to track a user across multiple scenes (e.g., scenes 401 and 402). Thus, a local id is used to track user 491 while moving within scene 401, and a different local id is used to track user 491 while also moving within scene 402, as the id's are local to the respective scenes. The global id is used to track user 491 while moving from scene 401 to scene 402.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A surveillance system, comprising:
    a plurality of cameras arranged at a deployment site with partial view overlap;
    a graphical user interface for placing a plurality of common area anchor boxes having matching ones located in different camera views, wherein each of the plurality of common area anchor boxes is designed to accommodate only one person at a time; and
    a processor device operatively coupled to the graphical user interface and the plurality of cameras for (i) detecting and tracking persons locally for each camera input video stream using the common area anchor boxes and assigning each detected ones of the persons a local track id, (ii) associating a same person in overlapping camera views to a global track id, and collecting associated track boxes as the same person moves in different camera views over time using a priority queue and the local track id and the global track id, (iii) performing track data collection by deriving a spatial transformation through matched track box features, associating track boxes matched through the spatial transformation with a metric, and collecting corresponding track boxes over time for scene coverage based on the metric, each of the associated track boxes corresponding to a different person.

2. The surveillance system of claim 1, wherein the processor device maintains the priority queue to scan through tracks across different ones of the plurality of cameras in order by timestamps.

3. The surveillance system of claim 2, wherein the priority queue stores the timestamps, channel identifiers, and track information of multiple people present per frame at a specific timestamp, a corresponding common area anchor box from among the plurality of common area anchor boxes, and a track index which gives a specific track present at the corresponding common area anchor box, the specific timestamp, and a corresponding channel identifier.

4. The surveillance system of claim 1, wherein collecting associated track boxes comprises identifying tracks entering a common area with Intersection over Union (IoU) above a threshold.

5. The surveillance system of claim 1, wherein collecting associated track boxes comprises iterating through the priority queue to associate close tracks in time from different ones of the plurality of cameras in the plurality of common area anchor boxes.

6. The surveillance system of claim 1, wherein the spatial transformation comprises a homography.

7. The surveillance system of claim 1, wherein the matched box features comprise at least one item selected from the group consisting of box coordinates, box centers, and person keypoints.

8. The surveillance system of claim 1, further comprising performing multi-camera tracking by training a multi-camera tracker given the matched track box features, tracking the common area anchor boxes of different people, and deploying the trained multi-camera tracker to track the same person across the plurality of cameras by feature similarities.

9. The surveillance system of claim 1, wherein performing track data collection further comprises removing the plurality of common area anchor boxes.

10. A computer-implemented method for surveillance, comprising:
    monitoring a plurality of cameras at a deployment site arranged with partial view overlap;
    placing, using a graphical user interface, a plurality of common area anchor boxes having matching ones located in different camera views, wherein each of the plurality of common area anchor boxes is designed to accommodate only one person at a time; and detecting and tracking persons locally for each camera input video stream using the common area anchor boxes and assigning each detected ones of the persons a local track id;

associating a same person in overlapping camera views to a global track id, and collecting associated track boxes as the same person moves in different camera views over time using a priority queue and the local track id and the global track id; and performing, by a processor device, track data collection by deriving a spatial transformation through matched track box features, associating track boxes matched through the spatial transformation with a metric, and collecting corresponding track boxes over time for scene coverage based on the metric, each of the associated track boxes corresponding to a different person.

11. The computer-implemented method of claim 10, wherein the processor device maintains the priority queue to scan through tracks across different ones of the plurality of cameras in order by timestamps.

12. The computer-implemented method of claim 11, wherein the priority queue stores the timestamps, channel identifiers, and track information of multiple people present per frame at a specific timestamp, a corresponding common area anchor box from among the plurality of common area anchor boxes, and a track index which gives a specific track present at the corresponding common area anchor box, the specific timestamp, and a corresponding channel identifier.

13. The computer-implemented method of claim 10, wherein collecting associated track boxes comprises identifying tracks entering a common area with Intersection over Union (IoU) above a threshold.

14. The computer-implemented method of claim 10, wherein collecting associated track boxes comprises iterating through the priority queue to associate close tracks in time from different ones of the plurality of cameras in the plurality of common area anchor boxes.

15. The computer-implemented method of claim 10, wherein the spatial transformation comprises a homography.

16. The computer-implemented method of claim 10, wherein the matched box features comprise at least one item selected from the group consisting of box coordinates, box centers, and person key points.

17. The computer-implemented method of claim 10, further comprising performing multi-camera tracking by training a multi-camera tracker given the matched track box features, tracking the common area anchor boxes of different people, and deploying the trained multi-camera tracker to track the same person across the plurality of cameras by feature similarities.

18. The computer-implemented method of claim 10, wherein performing track data collection further comprises removing the plurality of common area anchor boxes.

19. A computer program product for surveillance, the computer program product comprising a non-transitory computer readable storage medium having program instructions embodied therewith, the program instructions executable by a computer to cause the computer to perform a method comprising:

monitoring, by a processor device of the computer, a plurality of cameras at a deployment site arranged with partial view overlap;

placing, using a graphical user interface of the computer, a plurality of common area anchor boxes having matching ones located in different camera views, wherein each of the plurality of common area anchor boxes is designed to accommodate only one person at a time; and detecting and tracking, by the processor device, persons locally for each camera input video stream using the common area anchor boxes and assigning each detected ones of the persons a local track id;

associating, by the processor device, a same person in overlapping camera views to a global track id, and collecting associated track boxes as the same person moves in different camera views over time using a priority queue and the local track id and the global track id; and performing, by the processor device, track data collection by deriving a spatial transformation through matched track box features, associating track boxes matched through the spatial transformation with a metric, and collecting corresponding track boxes over time for scene coverage based on the metric, each of the associated track boxes corresponding to a different person.

20. The computer program product of claim 19, wherein the processor device maintains the priority queue to scan through tracks across different ones of the plurality of cameras in order by timestamps.

* * * * *